US011929082B2

(12) United States Patent
Friedrich et al.

(10) Patent No.: US 11,929,082 B2
(45) Date of Patent: Mar. 12, 2024

(54) AUDIO ENCODER AND AN AUDIO DECODER

(71) Applicant: DOLBY INTERNATIONAL AB, Zuidoost (NL)

(72) Inventors: Tobias Friedrich, Fürth (DE); Heiko Purnhagen, Sundbyberg (SE); Stanislaw Gorlow, Stockholm (SE); Celine Merpillat, Fuerth (DE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 17/290,739

(22) PCT Filed: Oct. 30, 2019

(86) PCT No.: PCT/EP2019/079683

§ 371 (c)(1),
(2) Date: Apr. 30, 2021

(87) PCT Pub. No.: WO2020/089302

PCT Pub. Date: May 7, 2020

(65) Prior Publication Data

US 2022/0005484 A1 Jan. 6, 2022

Related U.S. Application Data

(60) Provisional application No. 62/793,073, filed on Jan. 16, 2019, provisional application No. 62/754,758, filed on Nov. 2, 2018.

(30) Foreign Application Priority Data

Nov. 2, 2018 (EP) .................................... 18204046

(51) Int. Cl.
*G10L 19/008* (2013.01)

(52) U.S. Cl.
CPC ................................ *G10L 19/008* (2013.01)

(58) Field of Classification Search
CPC . G10L 19/008; G10L 19/167; H04S 2420/01; H04S 2420/03; H04S 7/30
(Continued)

(56) References Cited

U.S. PATENT DOCUMENTS 8,538,766 B2 9/2013 Hellmuth
8,634,577 B2 1/2014 Breebaart
(Continued)

FOREIGN PATENT DOCUMENTS

JP 6129348 B2 5/2017
RU 2630754 C2 9/2017
(Continued)

OTHER PUBLICATIONS

"Dolby AC-4: Audio Delivery for Next-Generation Entertainment Services" Jun. 2015.
(Continued)

*Primary Examiner* — Alexander Krzystan

(57) ABSTRACT

The present disclosure relates to the field audio coding, an in particular to an audio decoder having at least two decoding modes, and associated decoding methods and decoding software for such audio decoder. In one of the decoding modes, at least one dynamic audio object is mapped to a set of static audio objects, the set of static audio objects corresponding to a predefined speaker configuration. The present disclosure further relates to a corresponding audio encoder, and associated encoding methods and encoding software for such audio encoder.

22 Claims, 4 Drawing Sheets

(58) Field of Classification Search
USPC ................................ 381/310, 22, 23; 700/94
See application file for complete search history.

(56) References Cited

U.S. PATENT DOCUMENTS

| | | | |
|---|---|---|---|
| 8,958,566 B2 | 2/2015 | Hellmuth | |
| 9,489,954 B2 | 11/2016 | Hooks | |
| 9,805,725 B2 | 10/2017 | Crockett | |
| 9,883,309 B2 | 1/2018 | Samuelsson | |
| 9,940,938 B2 | 4/2018 | Dick | |
| 9,947,326 B2 | 4/2018 | Ghido | |
| 2008/0071530 A1 | 3/2008 | Ehara | |
| 2009/0271015 A1* | 10/2009 | Oh | H04S 3/02 700/94 |
| 2011/0040397 A1* | 2/2011 | Kraemer | G10L 19/00 700/94 |
| 2014/0023197 A1* | 1/2014 | Xiang | G10L 19/008 381/17 |
| 2014/0025386 A1 | 1/2014 | Xiang | |
| 2015/0245153 A1 | 8/2015 | Malak | |
| 2015/0255076 A1* | 9/2015 | Fejzo | G10L 19/24 704/500 |
| 2016/0125887 A1 | 5/2016 | Purnhagen et al. | |
| 2016/0163321 A1 | 6/2016 | Arnott | |
| 2016/0295216 A1* | 10/2016 | Aaron | H04N 21/23418 |
| 2016/0337776 A1* | 11/2016 | Breebaart | G10L 19/008 |
| 2017/0047071 A1 | 2/2017 | Melkote et al. | |
| 2017/0098452 A1* | 4/2017 | Tracey | G10L 19/26 |
| 2017/0180905 A1* | 6/2017 | Purnhagen | H04S 7/302 |
| 2017/0301355 A1 | 10/2017 | Hirvonen | |
| 2017/0339506 A1 | 11/2017 | Chen | |
| 2017/0366911 A1 | 12/2017 | Borss | |
| 2017/0374484 A1 | 12/2017 | Lando | |
| 2018/0008141 A1* | 1/2018 | Krueger | A61B 3/0025 |
| 2018/0053515 A1 | 2/2018 | Mehta | |
| 2018/0108364 A1 | 4/2018 | Purnhagen | |
| 2019/0289417 A1* | 9/2019 | Tomlin | G06F 3/165 |
| 2020/0005801 A1 | 1/2020 | Peichl | |
| 2021/0006922 A1* | 1/2021 | Swaminathan | H04N 21/2668 |
| 2022/0005484 A1* | 1/2022 | Friedrich | G10L 19/008 |

FOREIGN PATENT DOCUMENTS

| | | |
|---|---|---|
| RU | 2662407 C2 | 7/2018 |
| WO | 2015150384 | 10/2015 |
| WO | 2016168408 | 10/2016 |
| WO | 2017165837 | 9/2017 |

OTHER PUBLICATIONS

ETSI "Digital Audio Compression (AC-4) Standard Part 2: Immersive and Personalized Audio" Sep. 2015, ETSI TS 103 190-2.

Poers, Peter "Metadata Based Audio Production for Next Generation Audio Formats" SMPTE 2017 Annual Technical Conference and Exhibition, 2017.

Purnhagen, H. et al "Immersive Audio Delivery Using Joint Object Coding" AES presented at the 140th Convention, Jun. 4-7, 2016, Paris, France.

Riedmiller, J. "Dolby AC-4 Next-Generation Audio" Mar. 22, 2016.

Riedmiller, J. et al. "Delivering Scalable Audio Experiences using AC-4" IEEE Transactions on Broadcasting, vol. 63, Issue 1, 2017.

* cited by examiner

AUDIO ENCODER AND AN AUDIO DECODER

CROSS-REFERENCE TO RELATED APPLICATIONS

This application claims priority of the following priority applications: U.S. provisional application 62/754,758 (reference: D18053USP1), filed Nov. 2, 2018, EP application 18204046.9 (reference: D18053EP), filed Nov. 2, 2018, and U.S. provisional application 62/793,073 (reference D18053USP2), filed Jan. 16, 2019, which are hereby incorporated by reference.

TECHNICAL FIELD

The present disclosure relates to the field of audio coding, and in particular to an audio decoder having at least two decoding modes, and associated decoding methods and decoding software for such audio decoder. The present disclosure further relates to a corresponding audio encoder, and associated encoding methods and encoding software for such audio encoder.

BACKGROUND

An audio scene may generally comprise audio objects. An audio object is an audio signal which has an associated spatial position. If the spatial position of an audio object can vary with time, the audio object is typically called a dynamic audio object. If the position is static, the audio object is typically called a static audio object, or a bed object. A bed object is typically an audio signal which corresponds directly to a channel of a multichannel speaker configuration, such as a classical stereo configuration with a left and a right speaker, or a so-called 5.1 speaker configuration with three front speakers, two surround speakers, and a low frequency effects speaker, etc. A bed can contain one to many bed objects. It's a set of bed objects which thus can match a multichannel speaker configuration.

Since the number of audio objects typically may be very large, for instance in the order of tens or hundreds of audio objects, there is a need for encoding methods which allow the audio objects to be efficiently compressed at an encoder side, e.g. for transmission as a bitstream (data stream, etc.), especially when targeting low bit rates for the transmission. The clusters of dynamic audio objects may then, in certain decoding modes in an audio decoder, be parametrically reconstructed into individual audio objects again to be rendered into a set of output audio signals depending on the configuration of the output device (e.g. speakers, headphones, etc.) employed for playback of the audio signal. However, in some cases, the decoder is forced to work in a core mode, meaning that parametric reconstruction of individual dynamic audio objects from clusters of dynamic audio objects is not possible, e.g. due to restrictions of processing power of the decoder, or for other reasons. This may cause a problem, especially when an immersive audio experience (e.g. 3D audio) is expected from a user who is listening to the output audio.

There is thus a need for improvements in this context.

SUMMARY OF THE INVENTION

In view of the above, it is thus an object of the present invention to overcome or mitigate at least some of the problems discussed above. In particular, it is an object of the present disclosure to provide a, preferably immersive, audio output from received dynamic audio objects in a decoder in a core decoding mode. Moreover, it is an object of the present disclosure to provide an encoder for encoding an audio bitstream from a set of dynamic audio objects in a way that may allow for the decoding of the audio bitstream into a, preferably immersive, audio output according to the above. Further and/or alternative objects of the present invention will be clear for a reader of this disclosure.

According to a first aspect of the invention, there is provided an audio decoder comprising one or more buffers for storing a received audio bitstream, and a controller coupled to the one or more buffers.

The controller is configured to operate in a decoding mode selected from a plurality of different decoding modes, the plurality of different decoding modes comprising a first decoding mode and a second decoding mode, wherein of the first and second decoding modes only the first decoding mode allows full decoding of one or more encoded dynamic audio objects in the bitstream, into reconstructed individual audio objects.

When the selected decoding mode is the second decoding mode, the controller is configured to access the received audio bitstream, to determine whether the received audio bitstream includes one or more dynamic audio objects, and responsive at least to determining that the received audio bitstream includes one or more dynamic audio objects, to map at least one of the one or more dynamic audio objects to a set of static audio objects, the set of static audio objects corresponding to a predefined speaker configuration.

By including the step of mapping at least one of the one or more dynamic audio objects to a set of static audio objects, immersive audio output can be achieved from a low bit rate bitstream, for example restricted to only include up to 10 audio objects (dynamic and static), or up to 7, 5, etc., audio objects, even in a decoder operating in a low complexity decoding mode (core decoding) where parametric reconstruction of individual dynamic audio objects from clusters of dynamic audio objects is not possible (full decoding is not possible).

By the term "immersive audio output" should, in the context of present specification, be understood a channel output configuration which contains channels for top speakers.

By the term "immersive speaker configuration" a similar meaning should be understood, i.e., a speaker configuration which contains top speakers.

Furthermore, the present embodiment provides a flexible decoding method, since not all received dynamic audio objects are necessarily mapped to the set of static audio objects corresponding to a predefined speaker configuration. This e.g. allows for inclusion of additional dialogue objects in the audio bitstream which serve a different purpose, for example dialog or associated audio.

Moreover, the present embodiment allows for a flexible process of providing and later rendering the set of static audio objects, which will be further discussed below, to achieve for example a lower computational complexity, or permitting reuse of existing software code/functions used for implementing a decoder.

Generally, the present embodiment enables decoder-side flexibility in a low bit-rate, low-complexity scenario.

The step of determining, by the controller, that the received audio bitstream includes one or more dynamic audio objects may be accomplished in different ways. According to some embodiments, this is determined from the bitstream, e.g. metadata such as integer values or flag values etc. In other embodiments, this may be determined by analysis of the audio object, or associated object metadata.

The controller may select the decoding mode in different ways. For example, the selection may be done using a bitstream parameter, and/or in view of the output configuration for the rendered output audio signals, and/or by checking the number of dynamic audio objects (downmix audio objects, clusters, etc.) in the audio bitstream, and/or based on a user parameter, etc.

It should be noted that the decision to map at least one of the one or more dynamic audio objects to a set of static audio objects may be made using more information than just determining whether the received audio bitstream includes one or more dynamic audio objects. According to some embodiments, the controller bases such decision also on further data such as bitstream parameters.

By way of example, if it is determined that the received audio bitstream does not comprise dynamic audio objects, or otherwise determined that the mapping of dynamic audio objects discussed above should not be performed, the controller may decide to render the received static audio objects (bed objects) directly to a set of output audio channels, using e.g. received rendering coefficients (e.g. downmix coefficients) applicable to the configuration of the output audio channels. In this operational mode of the controller, any received dynamic audio objects are conventionally rendered to the output audio channels.

According to some embodiments, when the selected decoding mode is the second decoding mode, the controller is further configured to render the set of static audio objects to a set of output audio channels. Any other static audio objects received in the audio bitstream (such as an LFE) are also rendered to the set of output audio channels, advantageously in the same rendering step.

According to some embodiments, the configuration of the set of output audio channels differs from the predefined speaker configuration used for mapping the dynamic audio objects to a set of static audio objects as described above. Since the predefined speaker configuration is not limited to the configuration of the output audio channels, increased flexibility is achieved.

According to some embodiments, the audio bitstream comprises a first set of downmix coefficients, wherein the controller is configured to utilize the first set of downmix coefficients for rendering the set of static audio objects to a set of output audio channels. In case of further received static audio objects in the bitstream, the downmix coefficients will be applied to both the set of static audio objects and the further static audio objects.

The controller may in some embodiments use the received first set of downmix coefficients as is for rendering the set of static audio objects to a set of output audio channels. However, in other embodiments, the first set of downmix coefficients first needs to be processed based on what type of downmix operation on the encoder side that resulted in the one or more dynamic audio objects received in the bitstream.

In some embodiments, the controller is further configured to receive information pertaining to attenuation applied in at least one of the one or more dynamic audio objects on an encoder side. The information may be received in the bitstream, or may be predefined in the decoder. The controller may then be configured to modify the first set of downmix coefficients accordingly when utilizing the first set of downmix coefficients for rendering the set of static audio objects to a set of output audio channels. Consequently, attenuation included in the downmix coefficients but already having been applied on the encoder side is not applied twice, resulting in a better listening experience.

In some embodiments, the controller is further configured to receive information pertaining to a downmix operation performed on an encoder side, wherein the information defines an original channel configuration of an audio signal, wherein the downmix operation results in downmixing the audio signal to the one or more dynamic audio objects. In this case, the controller may be configured to select a subset of the first set of downmix coefficients based on the information pertaining to the downmix information, wherein the utilizing of the first set of downmix coefficients for rendering the set of static audio objects to a set of output audio channels comprises utilizing the subset of the first set of downmix coefficients for rendering the set of static audio objects to a set of output audio channels. This may result in a more flexible decoding method which handles all types of downmix operations performed on the encoder side and resulting in the received one or more dynamic audio objects.

According to some embodiments, the controller is configured to perform the mapping of the at least one of the one or more dynamic audio objects and the rendering of the set of static audio objects in a combined calculation using a single matrix. Advantageously, this may reduce the computational complexity of the rendering of the audio objects in the received audio bitstream.

According to some embodiments, the controller is configured to perform the mapping of the at least one of the one or more dynamic audio objects and the rendering of the set of static audio objects in individual calculations using respective matrices. In this embodiment, the one or more dynamic audio objects are pre-rendered into a set of static audio objects, i.e. defining an intermediate bed representation of the one or more dynamic audio objects. Advantageously, this permits reuse of existing software code/function used for implementing a decoder which is adapted to render a bed representation of the audio scene into a set of output audio channels. Moreover, this is embodiment reduces the additional complexity of implementation of the invention described herein in a decoder.

According to some embodiments, the received audio bitstream comprises metadata identifying the at least one of the one or more dynamic audio objects. This allows for an increased flexibility of the decoder method, since not all of the received one or more dynamic audio objects need to be mapped to the set of static audio objects, and the controller can easily determine, using said metadata, which of the received one or more dynamic objects that should be mapped, and which that should be forwarded directly to the rendering of the set of output audio channels.

According to some embodiments, the metadata indicates that N of the one or more dynamic audio objects are to be mapped to the set of static audio objects, wherein responsive to the metadata the controller is configured to map, to the set of static audio objects, N of the one or more dynamic audio objects selected from a predefined location or predefined locations in the received audio bitstream. For example, the N dynamic audio objects may be the first N received dynamic audio objects, or the last N received dynamic audio objects. Consequently, in some embodiments, responsive to the metadata the controller is configured to map, to the set of static audio objects, the first N of the one or more dynamic audio objects in the received audio bitstream. This allows for less metadata to identify the at least one of the one or more dynamic audio objects, e.g. an integer value.

According to some embodiments, the one or more dynamic audio objects included in the received audio bitstream comprises more than N dynamic audio objects. As mentioned above, for example for audio comprising dialogue in different languages, it may be advantageous to provide a dynamic audio object for each of the supported languages.

According to some embodiments, the one or more dynamic audio objects included in the received audio bitstream comprises the N dynamic audio objects and K further dynamic audio objects, wherein the controller is configured to render the set of static audio objects and the K further audio objects to a set of output audio channels. Accordingly, for example the selected language (i.e. the corresponding dynamic audio object) according to the above example may thus be rendered along with the set of static audio objects to the set of output audio signals.

According to some embodiments, the set of static audio objects consists of M static audio objects, and M>N>0. Advantageously, bitrate may be saved since the number of dynamic audio objects to be mapped can be reduced. Alternatively, the number (K) of further dynamic audio objects in the audio bitstream may be increased.

According to some embodiments, the received audio bitstream further comprises one or more further static audio objects. The further static objects may comprise an LFE, or other bed or Intermediate Spatial Format (ISF) objects.

According to some embodiments, the set of output audio channels is one of: stereo output channels; 5.1 surround sound output channels, 5.1.2 immersive sound output channels; or 5.1.4 immersive sound output channels.

According to some embodiments, the predefined speaker configuration is a 5.0.2 speaker configuration. In this embodiment, N may be equal to 5.

According to a second aspect of the invention, at least some of the above objects are achieved by a method in a decoder comprising the steps of:

- receiving an audio bitstream and storing the received audio bitstream in one or more buffers,
- selecting a decoding mode from a plurality of different decoding modes, the plurality of different decoding modes comprising a first decoding mode and a second decoding mode, wherein of the first and second decoding modes only the first decoding mode allows parametric reconstruction of individual dynamic audio objects from clusters of dynamic audio objects;
- operating a controller coupled to the one or more buffers in the selected decoding mode,
- when the selected decoding mode is the second decoding mode, the method further comprises the steps of:
  - accessing, by the controller, the received audio bit stream;
  - determining, by the controller, whether the received audio bitstream includes one or more dynamic audio objects; and
  - responsive at least to determining that the received audio bitstream includes one or more dynamic audio objects, mapping, by the controller, at least one of the one or more dynamic audio objects to a set of static audio objects, the set of static audio objects corresponding to a predefined speaker configuration.

According to a third aspect of the invention, at least some of the above objects are obtained by a computer program product comprising a computer-readable medium with computer code instructions adapted to carry out the method of the second aspect when executed by a device having processing capability.

The second and third aspects may generally have the same features and advantages as the first aspect.

According to a fourth aspect of the invention, at least some of the above objects are obtained by an audio encoder comprising:

- a receiving component configured for receiving a set of audio objects;
- a downmixing component configured for downmixing the set of audio objects to one or more downmixed dynamic audio objects, wherein at least one of the one or more downmixed dynamic audio objects is intended to, in at least one of a plurality of decoding modes on a decoder side, be mapped to a set of static audio objects, the set of static audio objects corresponding to a predefined speaker configuration;
- a downmix coefficients-providing component configured for determining a first set of downmix coefficients to be utilized for rendering the set of static audio objects corresponding to the predefined speaker configuration to a set of output audio channels at the decoder side;
- a bitstream multiplexer configured for multiplexing the at least one downmixed dynamic audio object and the first set of downmix coefficients into an audio bitstream.

According to some embodiments, the downmixing component further is configured for providing metadata identifying the at least one of the one or more downmixed dynamic audio objects to the bitstream multiplexer, wherein the bitstream multiplexer is further configured for multiplexing the metadata into the audio bitstream.

According to some embodiments, the encoder is further adapted to determine information pertaining to attenuation applied in at least one of the one or more dynamic audio objects when downmixing the set of audio objects to one or more downmixed dynamic audio objects, wherein the bitstream multiplexer is further configured for multiplexing the information pertaining to attenuation into the audio bitstream.

According to some embodiments, the bitstream multiplexer is further configured for multiplexing information pertaining to a channel configuration of the audio objects received by the receiving component.

According to a fifth aspect of the invention, at least some of the above objects are obtained by a method in an encoder comprising the steps of:

- receiving a set of audio objects;
- downmixing the set of audio objects to one or more downmixed dynamic audio objects, wherein at least one of the one or more downmixed dynamic audio objects is intended to, in at least one of a plurality of decoding modes on a decoder side, be mapped to a set of static audio objects, the set of static audio objects corresponding to a predefined speaker configuration;
- determining a first set of downmix coefficients to be utilized for rendering the set of static audio objects corresponding to the predefined speaker configuration to a set of output audio channels at the decoder side; and
- multiplexing the at least one downmixed dynamic audio object and the first set of downmix coefficients into an audio bitstream.

According to a sixth aspect of the invention, at least some of the above objects are obtained by a computer program product comprising a computer-readable medium with computer code instructions adapted to carry out the method of the fifth aspect when executed by a device having processing capability.

The fifth and sixth aspects may generally have the same features and advantages as the fourth aspect. Moreover, the fourth, fifth and sixth aspect may generally have the corresponding features (but from an encoder side) as the first, second and third aspect. For example, the encoder may be adapted to include static audio objects (such as an LFE) in the audio bitstream.

It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

In the below, the Dolby AC-4 audio format (as published in document ETSI TS 103 190-2 V1.2.1 (2018-02)) will be used as context for exemplifying the present invention. However, it should be noted that the scope of the invention is not limited to AC-4, and the different embodiments described herein may be employed for any suitable audio format.

Due to computational restrictions in some audio decoders, parametric reconstruction of individual dynamic audio objects from clusters of dynamic audio objects is not possible. Moreover, restrictions in the target bitrate for an audio bitstream may set restriction of the content of the audio bitstream, for example limiting the number of transmitted audio objects/audio channels to 10. A further restriction may originate from the encoding standard used, for example restricting the use of certain coding tools in some specific cases. For example, an AC-4 decoder is configured at different levels, where a level three decoder restricts the use of coding tools such as A-JCC (Advanced Joint Channel Coding) and A-CPL (Advanced Coupling) which otherwise may advantageously be used for achieving an immersive audio experience under certain circumstances. Such circumstances may include an essential channel encoding mode, but where the decoder does not have the coding tools to decode such content (e.g. the use of A-JCC is not permitted). In this case, the present invention may be used to “imitate” channel based immersive as described below. Further possible restrictions comprise the possibility to include both channel based content and dynamic/static audio objects (discrete audio objects) in the same bitstream, which may not be allowed under certain circumstances.

In this document the term ‘clusters’ refer to audio objects which are downmixed in the encoder as it will be described later with reference to FIG. 5. In a non-limiting example, 10 individual dynamic objects may be inputted to the encoder. In some cases, as described above, it is not possible to code all dynamic audio objects independently. For example, the target bit rate is such that it only allows for coding 5 dynamic audio objects. In this case it is necessary to reduce the total number of dynamic audio objects. A possible solution is to combine the 10 dynamic audio objects into a smaller number, 5 in this example, of dynamic audio objects. These 5 dynamic audio objects derived by combining (downmixing) the 10 dynamic audio objects are the dynamic downmixed audio objects which are referred to as ‘clusters’ in this application.

The present invention is aimed at circumventing some of the above restrictions, and providing an advantageous listening experience to the listener of audio output at low bitrate and decoder complexity.

Figure 1:
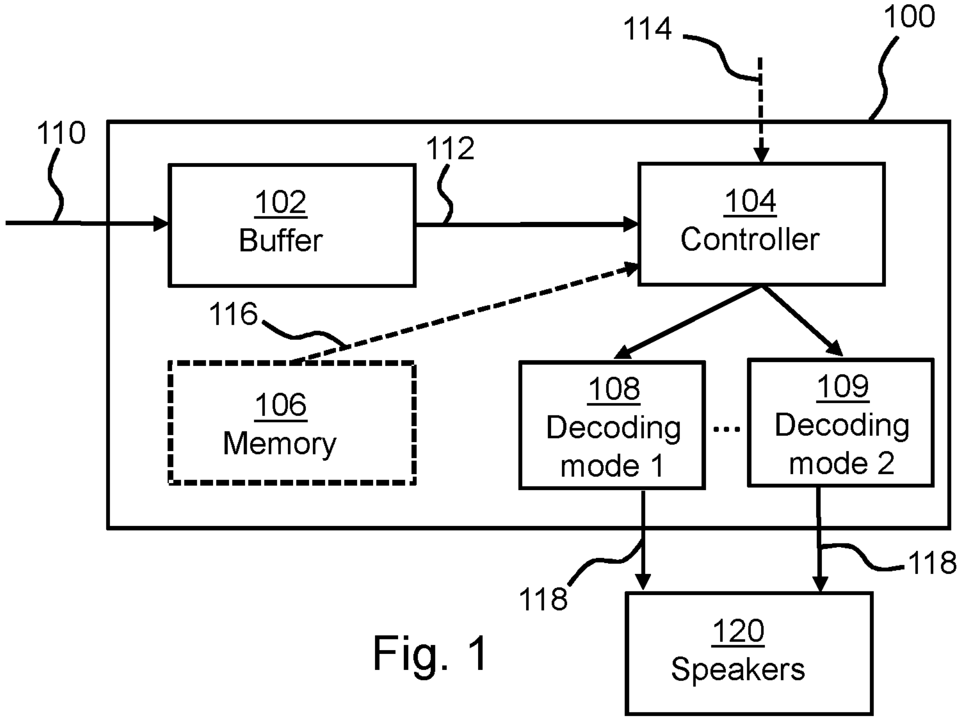
FIG. 1 shows an audio decoder according to some embodiments.

FIG. 1 shows byway of example an audio decoder 100. The audio decoder comprises one or more buffers 102 for storing a received audio bitstream 110. In some embodiments, the received audio bitstream contains an A-JOC (Advanced Joint Object Coding) substream, for example representing Music and Effects (M&E), or a combination of M&E and dialogue (D) (i.e. the complete MAIN (CM)).

Advanced Joint Object Coding (A-JOC) is a parametric coding tool to code a set of objects efficiently. A-JOC relies on a parametric model of the object-based content. This coding tool may determine dependencies among audio objects and utilize a perceptually based parametric model to achieve high coding efficiency.

The audio decoder 100 further comprises a controller 104 coupled to the one or more buffers 102. The controller 104 can thus extract at least parts of the audio bitstream 110 from the buffer(s) 102, to decode the encoded audio bitstream into a set of audio output channels 118. The set of audio output channels 118 may then be used for playback by a set of speakers 120.

As described above, the audio decoder 100, or the controller 104, can operate in different decoding modes. In the following, two decoding modes will exemplify this. However, further decoding modes may be employed.

In a first decoding mode (full decoding mode, complex decoding mode, etc.) the parametric reconstruction of individual dynamic audio objects from clusters of dynamic audio objects is possible. In the context of AC-4, the first decoding mode may be called A-JOC full decoding. In the non-limiting example given above with 10 individual dynamic objects and 5 clusters (dynamic downmixed audio objects), full decoding mode allows to reconstruct the 10 original individual dynamic objects (or an approximation thereof) from the 5 clusters.

In a second decoding mode (core decoding, low complexity decoding, etc.), such reconstruction is not carried out due to restrictions in the decoder 100. In the context of AC-4, the second decoding mode may be called A-JOC core decoding. In the non-limiting example given above with 10 individual dynamic objects and 5 clusters (dynamic downmixed audio objects), core decoding mode is not able to reconstruct the 10 original individual dynamic objects (or approximation thereof) from the 5 clusters.

The controller is thus configured to select a decoding mode, either the first or the second decoding mode. Such decision may be made based on internal parameters 116 of the decoder 100, for example stored in a memory of the decoder. Alternatively, or additionally, the decision may also be made based on input 114 from e.g. a user. Alternatively, or additionally, the decision may further be based on the content of the audio bitstream 110. For example, if the received audio bitstream comprises more than a threshold number of dynamic downmixed audio objects (e.g. more than 6, or more than 10, or any other suitable number depending on the context), the controller may select the second decoding mode. The audio bitstream 110 may in some embodiments comprise a flag value indicating to the controller which decoding mode to select.

For example, in the context of AC-4, according to one embodiment, the selection of the first decoding mode may be one or many of the following:

- The presentation level is 2 or below (bitstream parameter).
- The output stage is configured for 5.1.2 output (user parameter).
- The A-JOC substream contains at most 5 downmix objects (clusters) (bitstream parameter).
- The application does not force core decoding via API (user parameter).

In the following, the second decoding mode (core decoding) will be exemplified in conjunction with FIGS. 2-4.

Figure 2:
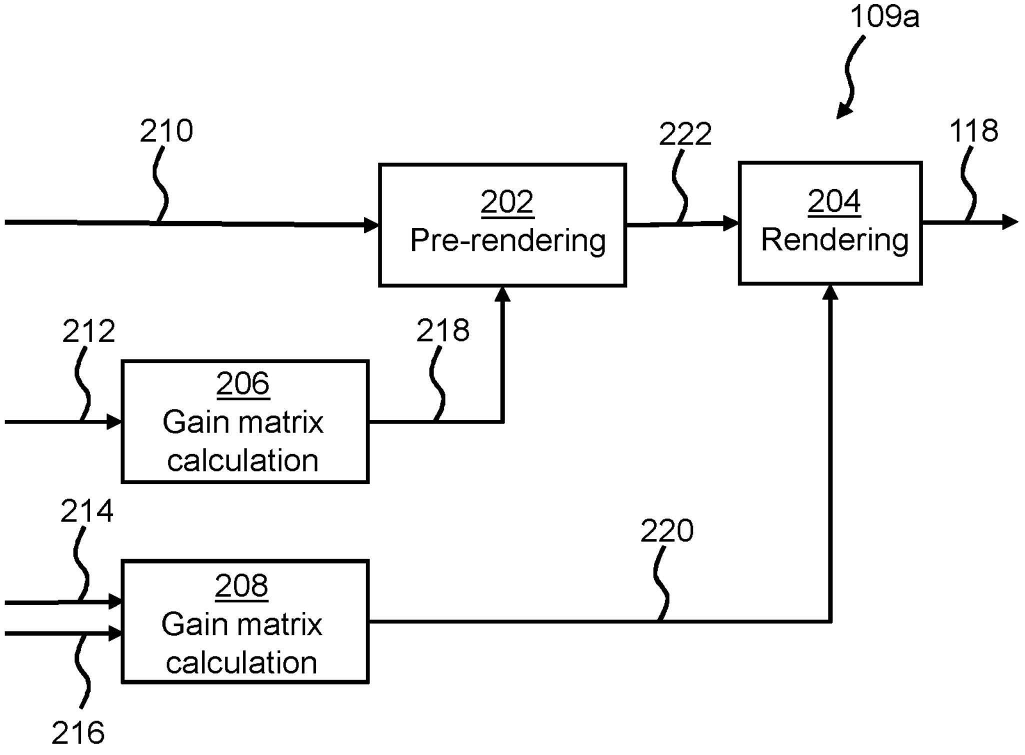
FIG. 2 shows a decoding operation according to a first embodiment.

FIG. 2 shows a first embodiment 109a of the second decoding mode which will be explained in conjunction with FIG. 1.

The controller 104 is configured to determine whether the received audio bitstream 110 includes one or more dynamic audio objects (which in this embodiment are all mapped to a set of static audio objects), and to base the decision, how to decode the received audio bitstream, thereon. According to some embodiments, the controller bases such decision also on further data such as bitstream parameters. For example, in AC-4, the controller may determine to decode the received audio bitstream as described in FIG. 2 according to the value of one or both of the following bitstream parameters, i.e. if one of the following is true:

1. "num_bed_obj_ajoc" is greater than zero (e.g. 1 to 7) or
2. "num_bed_obj_ajoc" is not present in the bitstream and "n_fullband_dmx_signals" is smaller than 6.

In case the controller 104 determines that one or more dynamic audio objects 210 should be taken into account, and optionally also in view of other data as described above, the controller is configured to map at least one 210 of the one or more dynamic audio objects to a set of static audio objects. In FIG. 2, all received dynamic audio objects are mapped to the set of static audio objects 222, the set of static audio objects 222 corresponding to a predefined speaker configuration. The mapping is done according to the following. The audio bitstream 110 comprises N dynamic audio objects 210. The audio bitstream further comprises N corresponding object metadata (object audio metadata, OAMD) 212. Each OAMD 212 defines the properties of each of the N dynamic audio objects 210, e.g. gain and position. The N OAMD 212 are used to calculate 206 a gain matrix 218 which is used to pre-render 202 the N dynamic audio objects 210 into a set of static audio objects 222. The size of the set of static audio objects is M. The N dynamic audio objects 210 is thus transformed (rendered) into a bed 222, for example a 5.0.2 bed (M=7). Other configurations are equally possible, such as 7.0.2 (M=9). The configuration of the bed (e.g. 5.0.2) is predefined in the decoder 100 which uses this knowledge to calculate 206 the gain matrix 218. In other words, the set of static audio objects 222 corresponds to a predefined speaker configuration. The gain matrix 218 in this case is thus M×N in size.

According to some embodiments, M>N>0.

Figure 3:
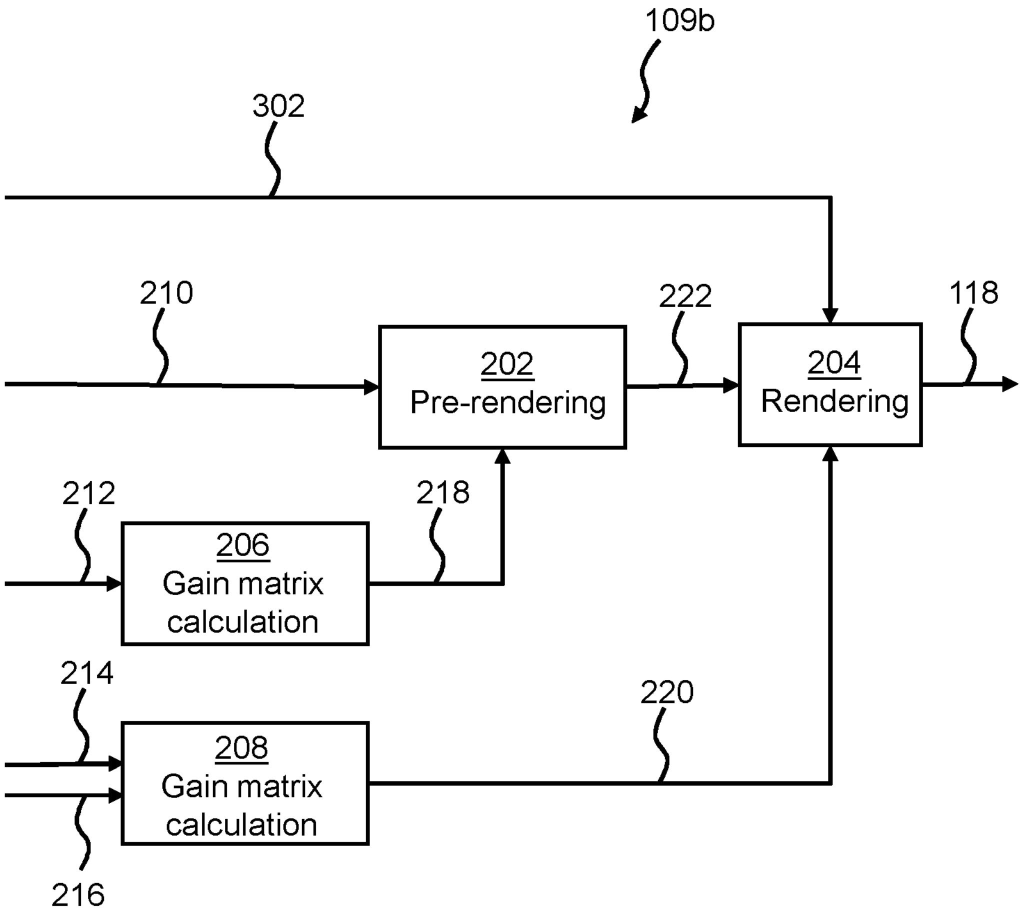
FIG. 3 shows a decoding operation according to a second embodiment.

An advantage of actually rendering the N dynamic audio objects 210 into a bed 222 is that the remaining operations of the decoder 100 (i.e. producing a set of output audio signals 118) may be achieved by reusing existing software code/functions used for implementing a decoder which is adapted to render a bed 222 (and optionally further dynamic audio objects as described in FIG. 3) into a set of output audio signals 118.

The decoder produces a set of further OAMD 214. These OAMD 214 define the positions and the gains for the intermediately rendered bed 222.

The OAMD 214 is thus not conveyed in the bitstream but instead locally "generated" in the decoder to describe the (typically 5.0.2) channel configuration generated at the output of the pre-rendering 202. For example, if the intermediate bed 222 is configured as a 5.0.2, the OAMD 214 define the positions (L, R, C, Ls, Rs, Ltm, Rtm) and the gains for the 5.0.2 bed 222. If another configuration of the intermediate bed is employed, e.g. 3.0.0, the positions would be L, R, C. The number of OAMD 214 in this embodiment thus corresponds to the number of static audio objects 222, for example 7 in the case of 5.0.2 bed 222. In some embodiments, the gain in each of the OAMD 214 is unity (1). The OAMD 214 thus comprise properties for the set of static audio objects 222, e.g. gain and position for each static audio object 222. In other words, the OAMD 214 indicate the predefined configuration of the bed 222.

The audio bitstream 110 further comprises downmix coefficients 216. Depending on the configuration of the set of output channels 118, the controller selects the corresponding downmix coefficients 216 to be utilized when calculating a second gain matrix 220. By way of example, the set of output audio channels is one of: stereo output channels; 5.1 surround sound output channels 5.1.2 immersive sound output channels (immersive audio output configuration); 5.1.4 immersive sound output channels (immersive audio output configuration); 7.1 surround sound output channels; or 9.1 surround sound output channels. The resulting gain matrix is thus Ch (number of output channels)×M in size. The selected downmix coefficients may be used as is when calculating the second gain matrix 220. However, as will be described further below in conjunction with FIG. 6, the selected downmix coefficients may need to be modified to compensate for attenuation performed on an encoder side when downmixing the original audio signal to achieve the N dynamic audio objects 210. Moreover, in some embodiments, the selection process of which downmix coefficients among the received downmix coefficients 216 that should be utilized for calculating the second gain matrix 220 may also be based on the downmix operation performed on the encoder side, in addition to the configuration of the set of output channels 118. This will also be described further below in conjunction with FIG. 6.

The second gain matrix is used at a rendering stage 204 of the decoder 100, to render the set of static audio objects 222 to the set of output audio channels 118.

It should be noted that in FIG. 2, the LFE is not shown. In this context, the LFE should be transmitted directly to the final rendering stage 204 to be included in (or mixed into) the set of output audio channels 118.

In FIG. 3, a second embodiment 109b of the second decoding mode is shown. Similar to the embodiment shown in FIG. 2, in this embodiment, a low-rate transmission (audio bitstream with low bitrate) decoded in a core decoding mode is shown. The difference in FIG. 3 is that the received audio bitstream 110 carries further audio objects 302 in addition to the N dynamic audio objects 210 that are mapped to the static audio objects 222. Such additional audio objects may comprise discrete and joint (A-JOC) dynamic audio objects and/or static audio objects (bed objects) or ISF. For example, the additional audio objects 302 may comprise:

LFE (zero to many)
other bed objects
other dynamic objects
ISF

Accordingly, in some embodiments, the dynamic audio objects included in the received audio bitstream count more than N dynamic audio objects 210. For example, dynamic audio objects included in the received audio bitstream comprise the N dynamic audio objects and K further dynamic audio objects. According to some embodiments, the received audio bitstream comprises M&E+D. In that case, if a separate dialogue is to be added when rendering the set of output channels 118, this may cause a problem in the low rate case where only 10 audio objects may be included in the received audio bitstream 110. In the case of the set of output channels 118 is in a 5.1.2 configuration, and bed objects were used (i.e. the legacy solution), 8 bed objects would be needed to be transmitted. This would leave only two possible audio objects representing the dialogue, which may be too few, e.g. if five different dialogue objects should be supported. Using the invention herein, immersive output audio may be achieved in this case by e.g. transmitting four (N) dynamic audio objects for M&E, which are mapped 202 to the set of static audio objects 222, one additional static object 302 for the LFE, and five (K) additional dynamic objects for the dialogue.

In the embodiment of FIG. 3, the N dynamic audio objects 210 is pre-rendered into M static audio objects 222 as described above in conjunction with FIG. 2.

For the rendering 204, a set of OAMD 214 is employed. The received audio bitstream comprises, in this example, 6 OAMD 214, one for each additional audio object 302. These 6 OAMD are thus included in the audio bitstream on an encoder side, to be used at the decoder 100 for the decoding process described herein. Moreover, as described above in conjunction with FIG. 2, the decoder produces a set of further OAMD 214 which defines the positions and the gains for the intermediately rendered bed 222. In total, 13 OAMD 214 exist in this example. An OAMD 214 comprises properties for the set of static audio objects 222, e.g. gain (i.e. unity) and position for each static audio object 222, and properties for the additional audio objects 302, e.g. gain and position for each additional audio object 302.

The audio bitstream 110 further comprises downmix coefficients 216 which are utilized for rendering the set of output channels 118 similar to what was described above in conjunction with FIG. 2, and will be described below in conjunction with FIG. 6.

The second gain matrix 220 is used at a rendering stage 204 of the decoder 100, to render the set of static audio objects 222, and the set of further audio objects 302 (which may include dynamic audio objects and/or static audio objects and/or ISF objects as defined above) to the set of output audio channels 118.

In the case described in FIG. 3, the controller needs to be aware of which received dynamic audio objects should be mapped to the set of static audio objects 222, and which should be passed directly to the final rendering stage 204. This may be accomplished in multiple different ways. For example, each received audio object may comprise a flag value informing the controller if the audio object is to be mapped (pre-rendered). In another example, the received audio bitstream comprises metadata identifying the dynamic audio object(s) that should be mapped. It should be noted that in the context of AC-4, only if any additional dynamic objects are part of a same A-JOC substream as the N dynamic audio objects, it is needed to find out the subset which is going to the pre-renderer 202, e.g. using a flag value or metadata as described above.

In one embodiment, the metadata indicates that N of the one or more dynamic audio objects are to be mapped to the set of static audio objects, whereby the controller knows that these N dynamic audio objects should be selected from a predefined location or predefined locations in the received audio bitstream. The dynamic audio objects 210 to be mapped may for example be the first, or the last, N audio objects in the audio bitstream 110. The number of audio objects to be mapped may be indicated by the flag value Num_bed_obj_ajoc (may also be called num_obj_with_bed_render_info) and/or n_fullband_dmx_signals in the AC-4 standard (as published in document ETSI TS 103 190-2 V1.2.1 (2018-02)). In other standards, other names of the flag values may be used. It should also be noted that flag values may be renamed for newer versions of the AC-4 standard referred above. According to some embodiments, if num_bed_obj_ajoc is greater than zero this means that num_bed_obj_ajoc dynamic objects are mapped to the set of static audio objects. According to some embodiments, if num_bed_obj_ajoc is not present and n_fullband_dmx_signals is smaller than six, this means that all dynamic objects are mapped to the set of static audio objects.

In some embodiments, dynamic audio objects are received prior to any static audio objects in the received bitstream 110. In other embodiments, the LFE is received first in the bitstream 110, prior to the dynamic audio objects and any further static audio objects.

Figure 4:
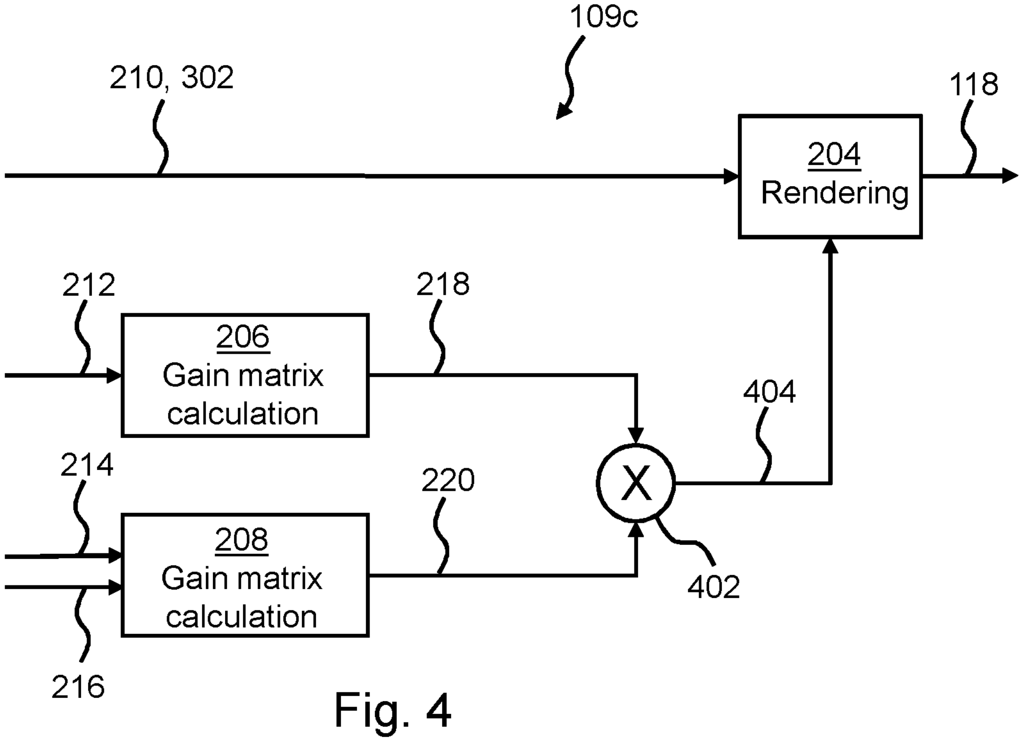
FIG. 4 shows a decoding operation according to a third embodiment.

FIG. 4 shows by way of example a third embodiment 109*c* of the second decoding mode 109. The double rendering stages 202, 204 of the embodiments of FIGS. 2-3 may in some cases be considered inefficient due to the computational complexity. Consequently, in some embodiments the two gain matrices 218, 220 are combined 402 into a single matrix 404 prior to rendering 204 the audio objects 210, 302 of the received audio bitstream 110 into the set of output channels 118. In this embodiment, a single rendering stage 204 is employed. The setup of FIG. 4 is applicable to both the case described in FIG. 2, where only dynamic objects 210 which are mapped to the set of static audio objects 222 are included in the received audio bitstream 110, as well as the case described in FIG. 3 where the received audio bitstream 110 in addition comprises further audio objects 302. In the case of FIG. 3, it should be noted that matrix 218 needs to be augmented by additional columns and/or rows handling the “pass through” of the additional objects 302 in case a matrix multiplication according to FIG. 4 should be employed.

Figure 5:
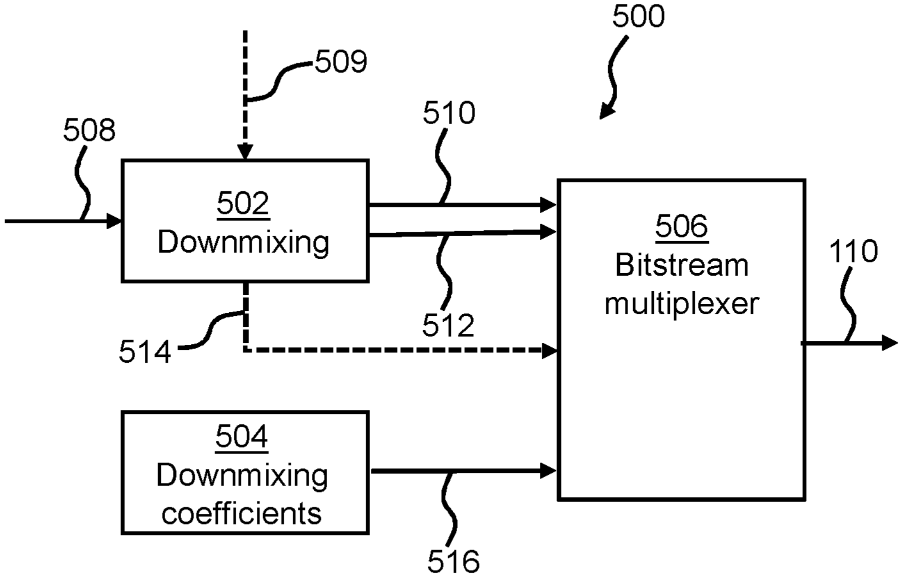
FIG. 5 shows an encoding operation according to some embodiments.

FIG. 5 shows by way of example an encoder 500 for encoding an audio bitstream 110 to be decoded according to any embodiment described above. In general terms, the encoder 500 comprises components corresponding to the content of the audio bitstream 110, for achieving such bitstream 110, as understood by a reader of this disclosure. Typically, the encoder 500 comprises a receiving component (not shown) configured for receiving a set of audio objects (dynamic and/or static). The encoder 500 further comprises a downmixing component 502 configured for downmixing the set of audio objects 508 to one or more downmixed dynamic audio objects 510, wherein at least one downmixed audio object 510 of the one or more downmixed dynamic audio objects is intended to, in at least one of a plurality of decoding modes on a decoder side, be mapped to a set of static audio objects, the set of static audio objects corresponding to a predefined speaker configuration. The downmixing component 502 may attenuate some of the audio objects as it will be described below in conjunction with FIG. 6. In this case, the attenuation performed needs to be compensated at the decoder side. Consequently, information of the attenuation performed and/or the configuration of the audio objects 508 is in some embodiments included in the bitstream 110. In other embodiments, the decoder is preconfigured with all/some of this information and consequently, such information may be omitted from the bitstream 110. In other words, in some embodiments, the bitstream multiplexer 506 is further configured for multiplexing information pertaining to a channel configuration of the audio objects 508 received by the receiving component into the audio bitstream. The original channel configuration (the format of the original audio signal) may be any suitable configuration such as 7.1.4, 5.1.4, etc. In some embodiments, the encoder (for example the downmixing component 502) is further adapted to determine information pertaining to attenuation applied in at least one of the one or more dynamic audio objects 510 when downmixing the set of audio objects 508 to one or more downmixed dynamic audio objects 510. This information (not shown in FIG. 5) is then transmitted to the bitstream multiplexer 506 which is configured for multiplexing the information pertaining to attenuation into the audio bitstream 110.

The encoder 500 further comprises a downmix coefficients providing component 504 configured for determining a first set of downmix coefficients to be utilized for rendering the set of static audio objects corresponding to the predefined speaker configuration to a set of output audio channels at the decoder side. As described later in conjunction with FIG. 6, depending e.g. on the downmixing operation performed by the downmixing component (attenuation and/or what type of downmixing that has been performed, from what configuration to which configuration), the decoder may need to make a further selection process and/or adjustment among the first set of downmix coefficients 516 before actually using the resulting downmix coefficients for rendering.

The encoder further comprises a bitstream multiplexer 506 configured for multiplexing the at least one downmixed dynamic audio object 510 and the first set of downmix coefficients 516 into an audio bitstream 110.

In some embodiments, the downmixing component 502 also provides metadata 514 identifying the at least one downmixed audio object 510 of the one or more downmixed dynamic audio objects to the bitstream multiplexer 506. In this case, the bitstream multiplexer 506 is further configured for multiplexing the metadata 514 into the audio bitstream 110.

In some embodiments, the downmixing component 502 receives a target bit rate 509, to determine specifics of the downmixing operation, e.g. how many downmixed audio objects that should be computed from the set of dynamic audio objects 508. In other words, the target bit rate may determine a clustering parameter for the downmix operation.

As understood, in case the one or more downmixed dynamic audio objects 510 comprise more than the dynamic audio object that is intended for being mapped to the set of static audio objects on a decoder side, downmixing coefficients need to be computed also for them. Furthermore, static audio objects (e.g. LFE, etc.) may also be transmitted by the bitstream multiplexer 506 for inclusion in the audio bitstream 110, along with corresponding downmix coefficients. Moreover, each audio object included in the audio bitstream 110 will have an associated OAMD, for example OAMD associated with all dynamic audio objects 510 which are intended to be mapped to the set of static audio objects at a decoder side, which will be multiplexed into the audio bitstream 110.

Figure 6:
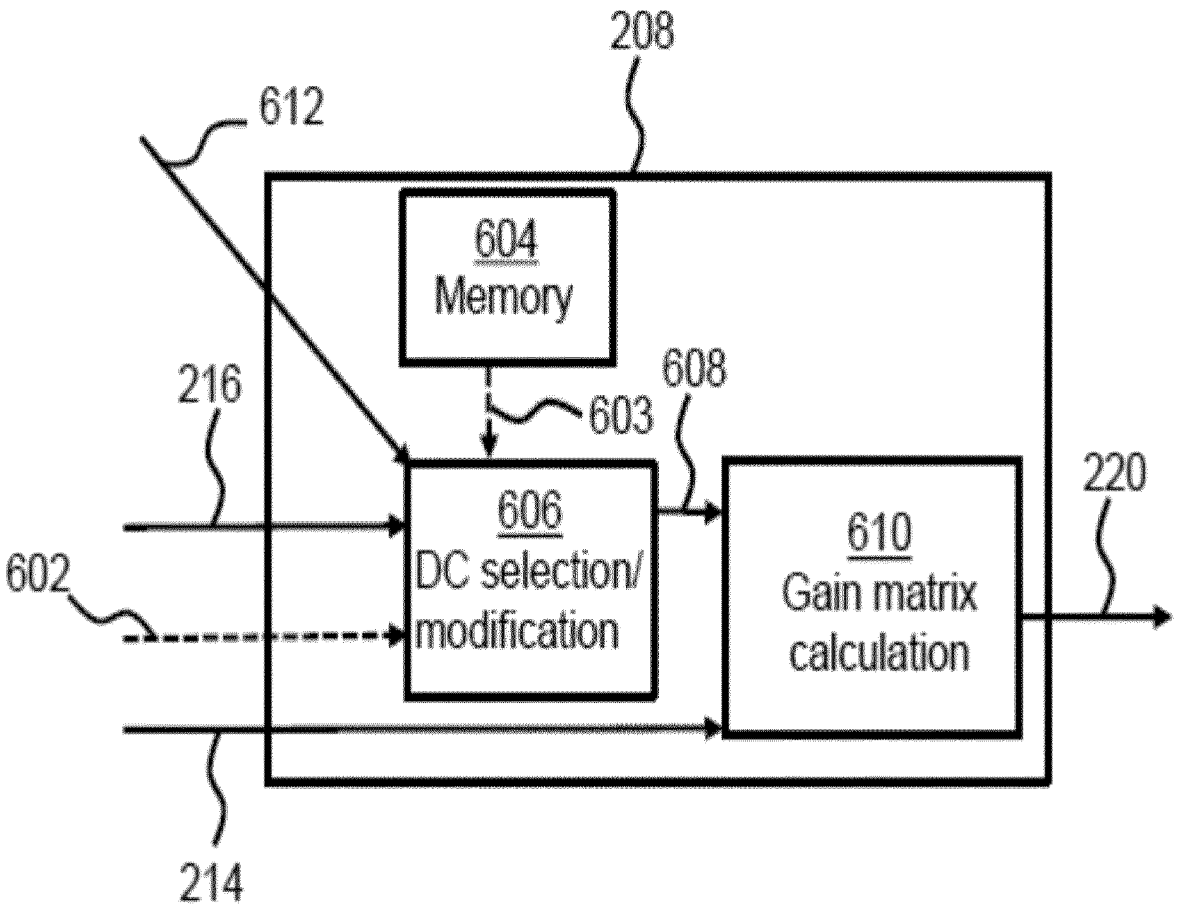
FIG. 6 shows by way of example a unit of an audio decoder for producing a gain matrix used for rendering a set of output audio channels.

FIG. 6 shows, by way of example, further details of how the second gain matrix 220 of FIG. 2-4 may be determined using a gain matrix calculation unit 208. As described above, the gain matrix calculation unit 208 receives downmix coefficients 216 from the bitstream. The gain matrix calculation unit 208 also, in this embodiment, receives data 612 relating to what type of downmix of the audio signal that was performed on an encoder side. The data 612 thus comprises information pertaining to a downmix operation performed on an encoder side, the downmix operation resulting in the N dynamic audio objects 210. The data 612 may define/indicate an original channel configuration of an audio signal being downmixed into the N dynamic audio objects 210. Based on the received data 612 and the received downmix coefficients 216, a downmix coefficients (DC) selection and modification unit 606 determines downmix coefficients 608, which subsequently will be used in a gain matrix calculation unit 610 to form the second gain matrix 220, using OAMD 214 as described above, as well as the configuration of the output channels 118, for example 5.1. The gain matrix calculation unit 610 is thus selecting those coefficients from the downmix coefficients 608 that are suitable for the requested configuration of the output channels 118 and determining the second gain matrix 220 to be used for this particular audio rendering setup. In some embodiments, the DC selection and modification unit 606 may directly select a set of downmix coefficients 608 from the received downmix coefficients 216. In other embodiments, the DC selection and modification unit 606 may need to first select downmix coefficients, and then modify them to derive the downmix coefficients 608 to be used at the gain matrix calculation unit 610 for calculating the second gain matrix 220.

The functionality of the DC selection and modification unit 606 will now be exemplified for particular setups of encoded and decoded audio.

In some embodiment, attenuation is applied in/to some of the transmitted audio objects 210 by the encoder. Such attenuation is the result of a downmixing process of an original audio signal to a downmix audio signal in the encoder. For example, if the format of the original audio signal is 7.1.4 (L, R, C, LFE, Ls, Rs, Lb, Rb, Tfl, Tfr, Tbl, Tbr), which is downmixed to a 5.1.2 ($L_d$, $R_d$, $C_d$, LFE, $Ls_d$, $Rs_d$, $Tl_d$, $Tr_d$) format in the encoder, the $Ls_d$ signal is determined in the encoder as:

$$NdB(Ls+Lb),$$

and the $Tl_d$ signal is determined in the encoder as:

$$MdB(Tfl+Tbl)$$

Typically, N=M=3, but other attenuation levels may be applied.

In this setup, a 3 dB attenuation is thus already applied in the $Ls_d$ and the $Tl_d$. In these examples, only the channels on the left side are described, while the channels on the right side are handled correspondingly.

It should be noted that the downmix (e.g. 5.1.2 channel audio) is then further reduced in the encoder to for example five dynamic audio objects (210 in FIGS. 2 and 3) to reduce the bit rate even more.

The relevant downmix coefficients 216 transmitted in the bitstream in this case are

- gain_tfb_to_tm: top front and/or top back to top middle gains.
- gain_t2a, gain_t2b: gains for top front channels to respective front and surround channels
  - Typical/default: gain_t2a maps to −Inf dB, gain_t2b maps to −3 dB, which means downmixing to the surround channels with −3 dB
- gain_t2d, gain_t2e: gains for top back channels to either front or surround channels.
  - typical/default: gain_t2d maps to −Inf dB, gain_t2e maps to −3 dB, which means downmixing to the surround channels with −3 dB
- gain_b4_to_b2: back and surround channels to surround channels
  - Typical/defaults: maps to −3 dB However, if the above downmix coefficients are directly applied for the case when the audio format of the output channels 118 is 5.1, this will result in that top channels Tfl and Tbl are attenuated with 6 dB in the surround output, i.e. the M=3 dB already applied in the encoder and the 3 dB of the gain_t2b downmix coefficient received in the bitstream. The same goes for the lower channels Ls and Lb which also will be attenuated with 6 dB in the surround output, i.e. the N=3 dB already applied in the encoder and the 3 dB of the gain_b4_to_b2 downmix coefficient received in the bitstream. To compensate for the attenuation already made on the encoder side, the DC selection and modification unit 606 is configured to, in this case, determine downmix coefficients 608 such that the output channels will be rendered as:

$$L_{out}=L_d+(+MdB+\text{gain\_}t2a)Tl_d=L+\text{gain\_}t2a(Tfl+Tbl),$$

and $$Ls_{out}=(+NdB+\text{gain\_}b4\text{\_to\_}b2)Ls_d+(+MdB+\text{gain\_}t2b)Tl_d=\text{gain\_}b4\text{\_to\_}b2(Ls+Lb)+\text{gain\_}t2b(Tfl+Tbl).$$

In this embodiment, the decoder selects gain_t2a, gain_t2b which are gains for top front channel to respective front and surround channels. These may thus be preferred over gain_t2d, gain_t2e which are the gains for top back channels. It should also be noted that the above equations are for conveying the idea of compensation of attenuation made by the encoder at the decoder, and that in reality, the equations to achieve this would be designed to make sure that the e.g. conversion from gains/attenuations in the logarithmic dB domain to linear gains is handled correctly.

To achieve the above, the decoder needs to be aware of attenuation made by the encoder. In some embodiments, the value of the N (dB) and the M (dB) are indicated in the bitstream as additional metadata 602. The additional metadata 602 thus define information pertaining to attenuation applied in at least one of the one or more dynamic audio objects on an encoder side. In other embodiments, the decoder is preconfigured (in a memory 604) with the attenuation 603 applied in the encoder. For example, the decoder may be aware of that 3 dB attenuation is always performed in the case of the 7.1.4 (or 5.1.4) to 5.1.2 downmix in the encoder. In the embodiments, the decoder is receiving information 602, 603 pertaining to attenuation applied in at least one of the one or more dynamic audio objects on an encoder side. This information 602, 603, in conjunction with the received data 612 indicating what type of downmix that has been performed in the encoder, may be used to select and/or adjust the downmix coefficients in the DC selection and modification unit 606 The selected and/or adjusted coefficients 608 will as mentioned above be used by the gain matrix calculation unit 610, in conjunction with the OAMD 214 and the configuration of the output audio signal 118 to form the second gain matrix 220.

In another exemplary setup, the original audio signal at the encoder is 5.1.2 with top front channels (L, R, C, LFE, Ls, Rs, Tfl, Tfr) which is downmixed to a 5.1.2 format with top middle channels instead ($L_d$, $R_d$, $C_d$, LFE, $Ls_d$, $Rs_d$, $Tl_d$, $Tr_d$). In this embodiment, no attenuation is made at the encoder. However, in this case, the DC selection and modification unit 606 needs to know what was the original signal configuration at the encoder side in order to select the appropriate downmix coefficients for the 5.1 output signal 118. The relevant downmix coefficients 216 transmitted in the bitstream in this case are: gain_t2a, gain_t2b which are gains for top front channels to respective front and surround channels. The DC selection and modification unit 606 is configured to, in this case, determine downmix coefficients 608 such that the output channels 118 will be rendered as:

$$L_{out}=L_d+\text{gain\_}t2a(Tl_d)=L+\text{gain\_}t2a(Tfl)$$ and $$Ls_{out}=Ls_d+\text{gain\_}t2b(Tl_d)=Ls+\text{gain\_}t2b(Tfl).$$

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present invention may be appreciated from the following enumerated example embodiments (EEEs):

EEE1. An audio decoder comprising:
- one or more buffers for storing a received audio bitstream; and
- a controller coupled to the one or more buffers and configured:
- to operate in a decoding mode selected from a plurality of different decoding modes, the plurality of different decoding modes comprising a first decoding mode and a second decoding mode, wherein of the first and second decoding modes only the first decoding mode allows parametric reconstruction of individual dynamic audio objects from clusters of dynamic audio objects; and when the selected decoding mode is the second decoding mode:
- to access the received audio bitstream;
- to determine whether the received audio bitstream includes one or more dynamic audio objects; and
- responsive at least to determining that the received audio bitstream includes one or more dynamic audio objects, to map at least one of the one or more dynamic audio objects to a set of static audio objects, the set of static audio objects corresponding to a predefined speaker configuration.

EEE2. The audio decoder of EEE1, wherein when the selected decoding mode is the second decoding mode, the controller is further configured to render the set of static audio objects to a set of output audio channels.

EEE3. The audio decoder of EEE2, wherein the audio bitstream comprises a first set of downmix coefficients, wherein the controller is configured to utilize the first set of downmix coefficients for rendering the set of static audio objects to the set of output audio channels.

EEE4. The audio decoder of EEE3, wherein the controller is further configured to receive information pertaining to attenuation applied in at least one of the one or more dynamic audio objects on an encoder side, wherein the controller is configured to modify the first set of downmix coefficients accordingly when utilizing the first set of downmix coefficients for rendering the set of static audio objects to a set of output audio channels.

EEE5. The audio decoder of EEE3 or EEE4, wherein the controller is further configured to receive information pertaining to a downmix operation performed on an encoder side, wherein the information defines an original channel configuration of an audio signal, wherein the downmix operation results in downmixing the audio signal to the one or more dynamic audio objects, wherein the controller is configured to select a subset of the first set of downmix coefficients based on the information pertaining to the downmix information, wherein the utilizing of the first set of downmix coefficients for rendering the set of static audio objects to a set of output audio channels comprises utilizing the subset of the first set of downmix coefficients for rendering the set of static audio objects to a set of output audio channels.

EEE6. The audio decoder of any one of EEE2-EEE5, wherein the controller is configured to perform the mapping of the at least one of the one or more dynamic audio objects and the rendering of the set of static audio objects in a combined calculation using a single matrix.

EEE7. The audio decoder of any one of EEE2-EEE5, wherein the controller is configured to perform the mapping of the at least one of the one or more dynamic audio objects and the rendering of the set of static audio objects in individual calculations using respective matrices.

EEE8. The audio decoder of any preceding EEE, wherein the received audio bitstream comprises metadata identifying the at least one of the one or more dynamic audio objects.

EEE9. The audio decoder of EEE8, wherein the metadata indicates that N of the one or more dynamic audio objects are to be mapped to the set of static audio objects, wherein responsive to the metadata the controller is configured to map, to the set of static audio objects, N of the one or more dynamic audio objects selected from a predefined location or predefined locations in the received audio bitstream.

EEE10. The audio decoder of EEE9, wherein the one or more dynamic audio objects included in the received audio bitstream comprises more than N dynamic audio objects.

EEE11. The audio decoder of EEE10, wherein the one or more dynamic audio objects included in the received audio bitstream comprises the N dynamic audio objects and K further dynamic audio objects, wherein the controller is configured to render the set of static audio objects and the K further audio objects to a set of output audio channels.

EEE12. The audio decoder of any one of EEE9-EEE11, wherein responsive to the metadata the controller is configured to map, to the set of static audio objects, the first N of the one or more dynamic audio objects in the received audio bitstream.

EEE13. The audio decoder of any one of EEE9-EEE12, wherein the set of static audio objects consists of M static audio objects, and $M>N>0$.

EEE14. The audio decoder of any preceding EEE, wherein the received audio bitstream further comprises one or more further static audio objects.

EEE15. The audio decoder of EEE2, or any preceding EEE dependent on EEE2, wherein the set of output audio channels is one of: stereo output channels; 5.1 surround sound output channels, 5.1.2 immersive sound output channels; or 5.1.4 immersive sound output channels.

EEE16. The audio decoder of any preceding EEE, wherein the predefined speaker configuration is a 5.0.2 speaker configuration.

EEE17. A method in a decoder comprising the steps of:

receiving an audio bitstream and storing the received audio bitstream in one or more buffers, selecting a decoding mode from a plurality of different decoding modes, the plurality of different decoding modes comprising a first decoding mode and a second decoding mode, wherein of the first and second decoding modes only the first decoding mode allows parametric reconstruction of individual dynamic audio objects from clusters of dynamic audio objects;

operating a controller coupled to the one or more buffers in the selected decoding mode, when the selected decoding mode is the second decoding mode, the method further comprises the steps of:

accessing, by the controller, the received audio bit stream;

determining, by the controller, whether the received audio bitstream includes one or more dynamic audio objects; and responsive at least to determining that the received audio bitstream includes one or more dynamic audio objects, mapping, by the controller, at least one of the one or more dynamic audio objects to a set of static audio objects, the set of static audio objects corresponding to a predefined speaker configuration.

EEE18. An audio encoder comprising a receiving component configured for receiving a set of audio objects;

a downmixing component configured for downmixing the set of audio objects to one or more downmixed dynamic audio objects, wherein at least one of the one or more downmixed dynamic audio objects is intended to, in at least one of a plurality of decoding modes on a decoder side, be mapped to a set of static audio objects, the set of static audio objects corresponding to a predefined speaker configuration;

a downmix coefficients providing component configured for determining a first set of downmix coefficients to be utilized for rendering the set of static audio objects corresponding to the predefined speaker configuration to a set of output audio channels at the decoder side;

a bitstream multiplexer configured for multiplexing the at least one downmixed dynamic audio object and the first set of downmix coefficients into an audio bitstream.

EEE19. The encoder of EEE18, wherein the downmixing component further is configured for providing metadata identifying the at least one of the one or more downmixed dynamic audio objects to the bitstream multiplexer, wherein the bitstream multiplexer if further configured for multiplexing the metadata into the audio bitstream.

EEE20. The encoder of any one of EEE18-EEE19, wherein the encoder is further adapted to determine information pertaining to attenuation applied in at least one of the one or more dynamic audio objects when downmixing the set of audio objects to one or more downmixed dynamic audio objects, wherein the bitstream multiplexer is further configured for multiplexing the information pertaining to attenuation into the audio bitstream.

EEE21. The encoder of any one of EEE18-EEE20, wherein the bitstream multiplexer if further configured for multiplexing information pertaining to a channel configuration of the audio objects received by the receiving component into the audio bitstream.

EEE22. A method in an encoder comprising the steps of:

receiving a set of audio objects;

downmixing the set of audio objects to one or more downmixed dynamic audio objects, wherein at least one of the one or more downmixed dynamic audio objects is intended to, in at least one of a plurality of decoding modes on a decoder side, be mapped to a set of static audio objects, the set of static audio objects corresponding to a predefined speaker configuration;

determining a first set of downmix coefficients to be utilized for rendering the set of static audio objects corresponding to the predefined speaker configuration to a set of output audio channels at the decoder side; and multiplexing the at least one downmixed dynamic audio object and the first set of downmix coefficients into an audio bitstream.

EEE23. A computer program product comprising a computer-readable storage medium with instructions adapted to carry out the method of any one of EEE17 or EEE22 when executed by a device having processing capability.

What is claimed is:

1. An audio decoder comprising:

one or more buffers for storing a received audio bitstream; and a controller coupled to the one or more buffers and configured:

to operate in a decoding mode selected from a plurality of different decoding modes for decoding the received audio bitstream into one or more dynamic audio objects that are each to be rendered to a set of output audio channels, one or more static audio objects that are each to be rendered to the set of output audio channels, or a combination thereof, a dynamic audio object comprising a time-varying spatial position indicated by first metadata, and a static audio object comprising a static spatial position indicated by second metadata, the plurality of different decoding modes comprising a first decoding mode and a second decoding mode, wherein of the first and second decoding modes only the first decoding mode allows full decoding of one or more encoded dynamic audio objects in the bitstream into reconstructed individual dynamic audio objects that each comprise a respective time-varying spatial position; and in the second decoding mode:

to access the received audio bitstream;

to determine whether the received audio bitstream includes one or more dynamic audio objects; and responsive at least to determining that the received audio bitstream includes one or more dynamic audio objects, to map at least one of the one or more dynamic audio objects to a set of static audio objects without fully decoding the at least one of the one or more dynamic audio objects into respective reconstructed individual dynamic audio objects as is performed in the first decoding mode, the set of static audio objects each corresponding to a channel of a predefined immersive speaker configuration.

2. The audio decoder of claim 1, wherein when the selected decoding mode is the second decoding mode, the controller is further configured to render the set of static audio objects to the set of output audio channels.

3. The audio decoder of claim 2, wherein the audio bitstream comprises a first set of downmix coefficients, wherein the controller is configured to utilize the first set of downmix coefficients for rendering the set of static audio objects to the set of output audio channels.

4. The audio decoder of claim 3, wherein the controller is further configured to receive information pertaining to attenuation applied in at least one of the one or more dynamic audio objects on an encoder side, wherein the controller is configured to modify the first set of downmix coefficients accordingly when utilizing the first set of downmix coefficients for rendering the set of static audio objects to the set of output audio channels.

5. The audio decoder of claim 3, wherein the controller is further configured to receive information pertaining to a downmix operation performed on an encoder side, wherein the information defines an original channel configuration of first audio signal, wherein the downmix operation results in downmixing the first audio signal to the one or more dynamic audio objects, wherein the controller is configured to select a subset of the first set of downmix coefficients based on the information pertaining to the downmix information, wherein the utilizing of the first set of downmix coefficients for rendering the set of static audio objects to the set of output audio channels comprises utilizing the subset of the first set of downmix coefficients for rendering the set of static audio objects to the set of output audio channels.

6. The audio decoder of claim 2, wherein the controller is configured to perform the mapping of the at least one of the one or more dynamic audio objects and the rendering of the set of static audio objects in a combined calculation using a single matrix, or wherein the controller is configured to perform the mapping of the at least one of the one or more dynamic audio objects and the rendering of the set of static audio objects in individual calculations using respective matrices.

7. The audio decoder of claim 1, wherein the received audio bitstream comprises additional metadata identifying the at least one of the one or more dynamic audio objects.

8. The audio decoder of claim 7, wherein the additional metadata indicates that N of the one or more dynamic audio objects are to be mapped to the set of static audio objects, wherein, responsive to the additional metadata, the controller is configured to map, to the set of static audio objects, N of the one or more dynamic audio objects selected from a predefined location or predefined locations in the received audio bitstream.

9. The audio decoder of claim 8, wherein the one or more dynamic audio objects included in the received audio bitstream comprises more than N dynamic audio objects.

10. The audio decoder of claim 9, wherein the one or more dynamic audio objects included in the received audio bitstream comprises the N dynamic audio objects and K further dynamic audio objects, wherein the controller is configured to render the set of static audio objects and the K further dynamic audio objects to the set of output audio channels.

11. The audio decoder of claim 8, wherein, responsive to the additional metadata, the controller is configured to map, to the set of static audio objects, a first N of the one or more dynamic audio objects in the received audio bitstream, and/or wherein the set of static audio objects consists of M static audio objects, and M>N>0.

12. The audio decoder of claim 1, wherein the received audio bitstream further comprises one or more further static audio objects, and/or wherein the predefined immersive speaker configuration is a 5.0.2 speaker configuration.

13. The audio decoder of claim 2, wherein the set of output audio channels is one of: stereo output channels; 5.1 surround sound output channels, 5.1.2 immersive sound output channels; or 5.1.4 immersive sound output channels.

14. A method in a decoder comprising the steps of:

receiving an audio bitstream and storing the received audio bitstream in one or more buffers, selecting a decoding mode from a plurality of different decoding modes for decoding the received audio bitstream into one or more dynamic audio objects that are each to be rendered to a set of output audio channels, one or more static audio objects that are each to be rendered to the set of output audio channels, or a combination thereof, a dynamic audio object comprising a time-varying spatial position indicated by first metadata, and a static audio object comprising a static spatial position indicated by second metadata, the plurality of different decoding modes comprising a first decoding mode and a second decoding mode, wherein of the first and second decoding modes only the first decoding mode allows full decoding of one or more encoded dynamic audio objects in the bitstream into reconstructed individual dynamic audio objects that each comprise a respective time-varying spatial position;

operating a controller coupled to the one or more buffers in the selected decoding mode, when the selected decoding mode is the second decoding mode, the method further comprises the steps of:

accessing, by the controller, the received audio bit stream;

determining, by the controller, whether the received audio bitstream includes one or more dynamic audio objects; and responsive at least to determining that the received audio bitstream includes one or more dynamic audio objects, mapping, by the controller, at least one of the one or more dynamic audio objects to a set of static audio objects without fully decoding the at least one of the one or more dynamic audio objects into respective reconstructed individual dynamic audio objects as is performed in the first decoding mode, the set of static audio objects each corresponding to a channel of a predefined immersive speaker configuration.

15. An audio encoder comprising a receiving component configured for receiving a set of dynamic audio objects that each comprise a respective time-varying spatial position indicated by first metadata;

a downmixing component configured for downmixing the set of dynamic audio objects to one or more downmixed dynamic audio objects, wherein at least one of the one or more downmixed dynamic audio objects is intended to, in at least one of a plurality of decoding modes on a decoder side, be mapped to a set of static audio objects corresponding to channels of a predefined immersive audio configuration without fully decoding the at least one of the one or more dynamic audio objects into respective reconstructed individual dynamic audio objects that each comprise the respective time-varying spatial position, each of the static audio objects comprising a static spatial positions indicated by second metadata;

a downmix coefficients providing component configured for determining a first set of downmix coefficients to be utilized for rendering the set of static audio objects corresponding to channels of the predefined immersive speaker configuration to a set of output audio channels at the decoder side;

a bitstream multiplexer configured for multiplexing the at least one downmixed dynamic audio object and the first set of downmix coefficients into an audio bitstream;

wherein the downmixing component is further configured to determine a number of the one or more downmixed dynamic audio objects based in part on a target bit rate of the audio stream.

16. The encoder of claim 15, wherein the downmixing component further is configured for providing additional metadata identifying the at least one of the one or more downmixed dynamic audio objects to the bitstream multiplexer, wherein the bitstream multiplexer is further configured for multiplexing the additional metadata into the audio bitstream and/or for multiplexing information pertaining to a channel configuration of the audio objects received by the receiving component into the audio bitstream.

17. The encoder of claim 15, wherein the encoder is further adapted to determine information pertaining to attenuation applied in at least one of the one or more dynamic audio objects when downmixing the set of audio objects to one or more downmixed dynamic audio objects, wherein the bitstream multiplexer is further configured for multiplexing the information pertaining to attenuation into the audio bitstream.

18. A method in an encoder comprising the steps of:

receiving a set of dynamic audio objects that each comprise a respective time-varying spatial position indicated by first metadata;

downmixing the set of dynamic audio objects to one or more downmixed dynamic audio objects, wherein at least one of the one or more downmixed dynamic audio objects is intended to, in at least one of a plurality of decoding modes on a decoder side, be mapped to a set of static audio objects corresponding to channels of a predefined immersive audio configuration without fully decoding the at least one of the one or more dynamic audio objects into respective reconstructed individual dynamic audio objects that each comprise the respective time-varying spatial position, each of the static audio objects comprising a static spatial position indicated by second metadata;

determining a first set of downmix coefficients to be utilized for rendering the set of static audio objects corresponding to channels of the predefined immersive speaker configuration to a set of output audio channels at the decoder side; and multiplexing the at least one downmixed dynamic audio object and the first set of downmix coefficients into an audio bitstream;

wherein a number of the one or more downmixed dynamic audio objects is determined based in part on a target bit rate of the audio stream.

19. A computer program product comprising a computer-readable storage medium with instructions adapted to carry out the method of claim 14 when executed by a device having processing capability.

20. A computer program product comprising a computer-readable storage medium with instructions adapted to carry out the method of claim 18 when executed by a device having processing capability.

21. The audio decoder of claim 1, wherein the controller is configured to operate in the second decoding mode based on internal parameters of the decoder.

22. The audio decoder of claim 1, wherein the controller is configured to operate in the first decoding mode in response to determining that the received audio bitstream includes an amount of dynamic audio objects that is less than or equal to a predetermined threshold number of dynamic audio objects; and wherein the controller is configured to operate in the second decoding mode in response to determining that the received audio bitstream includes an amount of dynamic audio objects that is greater than the predetermined threshold number of dynamic audio objects.

* * * * *